Patented Feb. 20, 1951

2,542,527

UNITED STATES PATENT OFFICE 2,542,527

PROCESS OF PRODUCING MICROPOROUS MATERIAL

Eric Maurice O'Conor Honey and Charles Rupert Hardy, Dagenham Dock, England, assignors to The Electric Storage Battery Co., a corporation of New Jersey No Drawing. Application October 16, 1943, Serial No. 506,600. In Great Britain October 17, 1942

6 Claims. (Cl. 18—48)

This invention relates to the production of micro-porous material, which can be advantageously used as separators or diaphragms more particularly between the plates of electric accumulators, and has for its object to provide an improved process for producing such material, separators or diaphragms. The requisites of a separator for an electric accumulator are a high degree of micro-porosity (to allow maximum diffusion of the electrolyte and free movement of ions) and the requisite strength or toughness for handling and to maintain shape when wet. In addition, the separator should be reasonably inert to the electrolyte and have some degree of flexibility. It is desirable that the separator should last in service at least as long as the accumulator plates.

In accordance with our invention, we produce a dough by incorporating in polyvinyl chloride, a thermoplastic polymer containing saturated aliphatic structural chains, fine particles of a substance which can be subsequently removed therefrom and which then leave micro pores in the polyvinyl chloride, and a solvent for the polyvinyl chloride which acts as a temporary plasticiser thereof (in that it softens and disperses the polyvinyl chloride and is readily removable) and which has no deleterious effect upon the said particles, the resulting "dough" being formed into desired shapes, the solvent removed, and the dough treated for the removal of the particles so as to leave micropores in the solid polyvinyl chloride, and dried. There may be a treatment of the micro porous material with a suitable wetting-out agent.

The invention further comprises the thorough mixing with the polyvinyl chloride of starch, which may have been previously dried and if necessary screened to remove any lumps or large particles, and a solvent, such as methyl cyclohexanone, which acts as a temporary plasticiser of the polyvinyl chloride, the mixing being effected at an elevated temperature (say a temperature of 80 to 100° C.) in a closed vessel fitted with a reflux condenser, the hot dough being then moulded, extruded or rolled to the desired shape.

The invention further comprises extruding the dough from a die box heated to a temperature at which the dough is sufficiently plastic, through a suitably shaped die rose or orifice on to a travelling belt or conveyor moving at such a speed that stretching and consequent narrowing of the extruded strip is avoided, as is also cockling due to insufficient belt speed.

The invention further comprises passing the shaped material upon an endless conveyor through a tunnel or channel in which the strip is subjected to heat, preferably the radiant heat of lamps, in order to evaporate the solvent which is then recovered.

The invention further comprises passing the material containing starch as the pore forming agent and from which the solvent has been removed into sulphuric acid at 90 to 100° C. to solubilize the starch, then into wash water, with a final drying.

The invention further comprises passing the material containing starch to form the desired pores and from which solvent has been removed, first into boiling water in order to swell the starch therein, (the material increasing in dimensions during such swelling), then into sulphuric acid at 90° to 100° C. which solubilises the starch and causes the strip to shrink from its swollen condition, then into boiling wash water, the strip being finally dried at about 70° C., and cut up as desired.

The invention further comprises treating the material before treatment with sulphuric acid, with caustic alkali at 90° to 100° C., the said caustic alkali treatment following or taking the place of the boiling water treatment.

The invention further comprises treating the material with a wetting-out agent, such as sulphonated oleic acid, prior to final drying. Such treatment causes the surfaces of the polyvinyl chloride to be readily wettable by electrolyte. Thus the electrical resistance of the porous material when used as a diaphragm or separator for accumulators is appreciably reduced.

In one convenient application of our invention, we use maize starch which has been suitably dried and if necessary screened to remove lumps or large particles, and we mix 75 lbs. thereof with 15 lbs. of a thermoplastic polymer containing saturated aliphatic structural chains such as polyvinyl chloride in the form of unplasticised powder and 29 lbs. of methyl cyclohexanone. The mixer is heated to about 100° C. and is fitted with a reflux condenser. After about 30 minutes mixing, the mixer and contents are cooled to 80° C. or thereabouts and the dough transferred to a die box heated to about 80° C. fitted with a hydraulic plunger. There is a suitably shaped die-rose or orifice on the box. The extruded strip is delivered on to a belt conveyor travelling at such a speed, which may be about 10 feet per minute, that it neither draws out nor cockles the strip. The latter after a certain length, say six feet, of travel on the conveyor may be transferred to a further conveyor which passes it through a tunnel or channel with radiant heat lamps therein maintaining the temperature of the material at about 100° to 130° C. to effect evaporation of the solvent, which is then recovered. The length of the tunnel or channel, or of the part thereof in which heat is applied to the material, will be determined by the time taken to complete the evaporation of the solvent, which will depend on the character of the solvent, the thickness of the material and other conditions. If desired the mixture may have say 1% carbon black incorporated therein to facilitate drying by radiant heat. The strip is now passed for about one hour through boiling water which swells the starch, then for about one hour through 5% caustic soda at 90° C. to 100° C., then for about one hour through 5% sulphuric acid at 90° to 100° C. which digests the starch, then through boiling wash water for about 30 minutes to remove the acid and then finally for several hours through a wetting-out agent. It is finally air dried at about 70° C. and cut to desired dimensions.

It will be appreciated that the starch granules swell considerably when the strip is immersed in boiling water or alkali for any length of time, and the strip increases in dimensions. The shrinkage in the subsequent treatment depends upon the temperature at which it is carried out and at 90° to 100° C. we find the strip will return to about its original dimensions. The swelling treatment with boiling water and/or the alkali treatment improves the performance of the diaphragm as an accumulator separator.

Starch is a suitable material to give micro porosity by its subsequent removal, because any particular species, such as maize starch, possesses fairly uniform particle size, and the particles are not seriously altered in the mixing of the dough and its fabrication into diaphragms or separators.

The choice of solvent is governed by its ability to disperse and soften the polyvinyl chloride so as to produce a workable dough at a convenient working temperature as before indicated, and by its capacity for ready removal and recovery from the extruded, or shaped material. Examples of suitable solvents are cyclohexanone, methyl cyclohexanone and chlorobenzene.

Polyvinyl chloride is usually in commerce mixed with plasticisers to reduce its brittleness, but we have found that during mixing with starch, the solvent gives the necessary properties to unplasticised polyvinyl chloride to enable it to coat the starch granules and to flow freely, and though the product is brittle after the evaporation of the solvent therefrom, it acquires a degree of flexibility and toughness when the starch is removed and the strip or article becomes micro-porous. A solvent has the advantage that it acts as a temporary plasticiser in that it disperses and softens the polyvinyl chloride during the production of the strip or diaphragm, after which it can be removed, when flexibility of the product is obtained due to its porosity. If exceptional flexibility is required, so as to enable, for example, the micro-porous material to be used as an envelope to enclose a plate of an accumulator, then one of the usual plasticisers, such as tri-cresyl phosphate, may be incorporated in the mixture in addition to the solvent.

It is advantageous to carry out the processing of the polyvinyl chloride, except its final drying, at temperatures exceeding 78° C. At about that temperature polyvinyl chloride changes from an elastic to a plastic condition, being a thermoplastic material, these terms being used to refer to the fact that the properties of the material above and below a given temperature are different in terms of elasticity and plasticity.

The micro porous polyvinyl chloride, which constitutes our material, diaphragms or separators, may if desired be loaded with wood flour or other suitable filler for cheapness of production. The material may also be coloured by the addition of suitable colouring ingredients.

Our material when made into separators for electric accumulators is more inert to the electrolyte and oxidising materials, such as nascent oxygen, than wood separators and has a much longer life. It is also stronger than wood for separators, wood being weak across the grain, the micro porosity of our product can be controlled, whereas the micro porosity of wood is determined by the spatial arrangement of its cellulose.

The process of manufacture of our material in the form of diaphragms or separators for electric accumulators is much simpler and more economical than the usual process of manufacture of micro porous rubber separators, which have to be vulcanised and require considerable preparatory treatment prior to the mixing in of the starch. Many micro porous rubber separators are very brittle and difficult to handle.

The fact that we can produce the required sections of our material in continuous lengths by extrusion is a great advantage from the point of view of large scale economical manufacture.

Waste or spoilt material can be reprocessed, which is an advantage.

We claim:

1. A process for the production of microporous material comprising the steps of mixing approximately one part by weight of dry, finely divided particles of polyvinyl chloride, approximately five parts by weight of dry, finely divided starch, and approximately two parts by weight of a solvent of the group consisting of cyclohexanone, methyl cyclohexanone and chlorobenzene, and thereby forming a dough in which said solvent acts as a temporary plasticizer for the coating of the starch particles, extruding the dough as a sheet, removing the plasticizer by evaporation, passing the extruded sheet through water at approximately boiling temperature to swell the starch particles thereby to increase the dimensions of the sheet, passing the swollen sheet through hot acid to digest the starch and to shrink the sheet to approximately its original dimensions, and then washing and drying the sheet.

2. A process for the production of microporous material comprising the steps of forming an extrudable dough from polyvinyl chloride and finely divided particles of starch by mixing them with a solvent for the polyvinyl chloride which acts as a temporary plasticizer thereof to cause the polyvinyl chloride to coat the starch particles, extruding the dough as a strip, removing the solvent by evaporation, treating the extruded strip with water at approximately boiling temperature for a time adequate to cause swelling of the starch particles materially to increase the dimensions of the strip, passing the swollen strip through hot acid for a time adequate to digest the starch and to allow the strip to return to approximately its original dimensions, and then washing and drying the strip.

3. A process for the production of microporous material comprising the steps of forming an extrudable dough from polyvinyl chloride and finely divided particles of starch by mixing them with a solvent for the polyvinyl chloride which acts as a temporary plasticizer thereof to cause the polyvinyl chloride to coat the starch particles, forming the dough into a desired shape, removing the solvent by evaporation, treating the shaped material with a hot liquid capable of swelling the starch particles to increase the dimensions of the shaped material, passing the swollen shaped material through hot acid to digest the starch and to allow the shaped material to return to approximately its original dimensions, and then washing and drying the shaped material.

4. A process for the production of microporous material comprising the steps of forming a dough from polyvinyl chloride and finely divided particles of starch with a solvent for the polyvinyl chloride which acts as a temporary plasticizer thereof for coating said starch particles, extruding the dough as a strip, removing the plasticizer by evaporation, passing the extruded strip through an aqueous solution of an alkali at approximately boiling temperature to swell the starch particles thereby to increase the dimensions of the strip, passing the swollen strip through hot acid which digests the starch for shrinkage of the strip to approximately its original dimensions, washing the strip, immersing it in a wetting-out agent, and then drying the strip.

5. A process for the production of microporous separators for battery plates comprising the steps of mixing with finely divided particles of polyvinyl chloride a pore-forming agent comprising finely divided starch and a solvent in sufficient quantity to act as a temporary plasticizer, working the material thoroughly to coat the starch particles with said polyvinyl chloride and to form an extrudable dough, extruding the dough as a sheet, removing the solvent by evaporation, the extruded sheet then being relatively brittle, treating the brittle sheet with water at approximately its boiling temperature for a time interval sufficient for adequate water absorption by the finely divided starch to cause the particles thereof to swell and to stretch the polyvinyl chloride coating, removing the starch by digesting the particles in 5% sulfuric acid at a temperature in the range of 90° C. to 100° C., and then washing and drying the sheet which due to its porosity is materially less brittle than before removal of said starch.

6. A process for the production of microporous separators for battery plates comprising the steps of mixing with finely divided particles of polyvinyl chloride a pore-forming agent comprising finely divided starch and a solvent in sufficient quantity to act as a temporary plasticizer, said solvent being selected from the group consisting of cyclohexane, methyl cyclohexanone, and chlorobenzene, working the material thoroughly to coat the starch particles and to form an extrudable dough, forming the dough into a desired shape, removing the solvent by evaporation, the shaped dough then being relatively brittle, treating the brittle shaped dough with water at approximately its boiling temperature for a time interval sufficient for adequate water absorption by the finely divided starch to cause the particles thereof to swell and to stretch the polyvinyl chloride coating to render the shaped dough less brittle and more porous after removal of the starch, removing the starch by digesting the particles in 5% sulfuric acid at a temperature in the range of 90° C. to 100° C., and then washing and drying the shaped dough which due to its porosity is materially less brittle than before removal of said starch.

ERIC MAURICE O'CONOR HONEY.
CHARLES RUPERT HARDY.

REFERENCES CITED

The following references are of record in the file of this patent:

UNITED STATES PATENTS

| Number | Name | Date |
|---|---|---|
| 788,173 | Cross | Dec. 20, 1904 |
| 941,159 | Militz | Nov. 23, 1909 |
| 1,332,348 | Macdonald | Mar. 2, 1920 |
| 1,929,453 | Semon | Oct. 10, 1933 |
| 2,011,160 | Plepp | Aug. 13, 1935 |
| 2,023,204 | Monters et al. | Aug. 20, 1932 |
| 2,175,798 | Hauser | Oct. 10, 1939 |
| 2,181,299 | Burgess | Nov. 28, 1939 |
| 2,189,889 | Engel | Feb. 13, 1940 |
| 2,315,366 | Daley et al. | Mar. 30, 1943 |
| 2,371,868 | Berg et al. | Mar. 20, 1945 |
| 2,372,669 | Haney et al. | Apr. 3, 1945 |
| 2,372,695 | Taylor | Apr. 3, 1945 |

FOREIGN PATENTS

| Number | Country | Date |
|---|---|---|
| 228,844 | Great Britain | June 8, 1925 |
| 402,055 | Great Britain | Apr. 8, 1932 |

OTHER REFERENCES

Ser. No. 268,117, Engel (A. P. C.), published Apr. 27, 1943.

Certificate of Correction

Patent No. 2,542,527                                          February 20, 1951

ERIC MAURICE O'CONOR HONEY ET AL.

It is hereby certified that error appears in the printed specification of the above numbered patent requiring correction as follows:

Column 5, line 30, for the words "wetting-cut" read *wetting-out*;

and that the said Letters Patent should be read as corrected above, so that the same may conform to the record of the case in the Patent Office.

Signed and sealed this 5th day of June, A. D. 1951.

[SEAL]

THOMAS F. MURPHY,
*Assistant Commissioner of Patents.*